United States Patent
Stieler

[19]
[11] Patent Number: 6,047,608
[45] Date of Patent: Apr. 11, 2000

[54] FOLDING DEVICE FOR BLADE FOLDS

[75] Inventor: Andreas Stieler, Augsburg, Germany

[73] Assignee: MAN Roland Druckmaschinen AG, Offenbach am Main, Germany

[21] Appl. No.: 09/092,799

[22] Filed: Jun. 5, 1998

[30] Foreign Application Priority Data

Jun. 5, 1997 [DE] Germany ............... 197 23 608

[51] Int. Cl.[7] ............................................. F16H 55/18
[52] U.S. Cl. .................. 74/409; 74/440; 475/331
[58] Field of Search ....................... 475/331, 342, 475/346, 347; 74/409, 440

[56] References Cited

U.S. PATENT DOCUMENTS

| | | | |
|---|---|---|---|
| 1,449,903 | 3/1923 | Leow ................................. | 74/440 |
| 2,607,238 | 8/1952 | English et al. ..................... | 74/440 |
| 3,174,356 | 3/1965 | Michalec ........................... | 74/409 |
| 3,365,973 | 1/1968 | Henden ............................. | 74/409 |
| 3,648,534 | 3/1972 | Fagarazzi .......................... | 74/440 |
| 4,663,981 | 5/1987 | Louradour et al. ................. | 74/409 |
| 4,745,823 | 5/1988 | Morita et al. ...................... | 74/409 |
| 4,759,234 | 7/1988 | Premiski et al. ................... | 475/331 |

FOREIGN PATENT DOCUMENTS

| | | |
|---|---|---|
| 2 520 828 | 8/1983 | France . |
| 2 544 043 | 10/1984 | France . |
| 4426987 A1 | 2/1996 | Germany . |
| 4426987A1 | 2/1996 | Germany . |
| 19511054 A1 | 9/1996 | Germany . |
| 1-047308 | 2/1989 | Japan . |
| 1-116251 | 8/1989 | Japan . |
| 2-129434 | 5/1990 | Japan . |
| 55-120849 | 10/1998 | Japan . |

Primary Examiner—Sherry L. Estremsky
Attorney, Agent, or Firm—Cohen, Pontani, Lieberman & Pavane

[57] ABSTRACT

To increase folding accuracy in a blade folding device with planetary gearsets for fold adjustment, each planetary gearwheel is equipped with an auxiliary gearwheel circumferentially resiliently held against the planetary gearwheel for minimizing backlash in these planetary gearwheels.

3 Claims, 4 Drawing Sheets

FOLDING DEVICE FOR BLADE FOLDS

BACKGROUND OF THE INVENTION

1. Field of the Invention

The invention relates to a folding device for a jaw fold.

2. Description of the Related Art

German reference DE 44 26 987 A1 discloses a generic folding device for a jaw fold. In the disclosed prior art device, for the primary fold adjustment, two planetary gearsets are arranged on the drive journal of the point folding blade cylinder. The planetary gearsets contain a first planetary gearwheel arranged on a drive planet-arm gear and a second planetary gearwheel arranged on an output planet-arm gear. The two planetary gearwheels engage into a shared sun gear, as well as into first and second internal gearwheels, respectively. A cylinder segment with folding blades is attached to the output planet-arm gear. To adjust the output planet-arm gear with the folding blades, an internal gearwheel is turned. Synchronously with this adjustment movement, the adjacent folding blade cylinder with its folding blades is adjusted as well.

Another gear mechanism containing two planetary gearsets may be arranged on the drive-side journal of a gripper folding blade cylinder, with which the position of a second cross fold are adjustable relative to a first cross fold.

In these gear mechanisms, which are characterized by a large number of toothed engagements, circumferential backlash can lead to deviations in the fold position. Moreover, pitch errors and radial deviations may also disadvantageously influence fold accuracy.

SUMMARY OF THE INVENTION

The object of the invention is to provide a folding device which overcomes the problems of the prior art folding devices and with increased fold accuracy.

According to the invention, a folding device for a jaw fold with a folding cylinder having a drive journal and first and second cylinder elements carrying folding elements, said folding device comprises: first and second planetary gear sets, said first planetary gear set comprising a drive planet-arm gear and a first planetary gear wheel rotatably mounted on said drive planet-arm gear and said second planetary gear set comprising an output planet-arm gear and a second planetary gear wheel rotatably mounted on said output planet-arm gear; a first internal gear wheel fixedly connected to the first cylinder element and in interlocking gear tooth engagement with said first planetary gear wheel; a second internal gear wheel fixedly connected to the second cylinder element and in interlocking gear tooth engagement with said second planetary gear wheel; a sun gear rotatably mounted on said drive journal, wherein said first planetary gear wheel and said second planetary gear wheel are in an interlocking gear tooth engagement with said sun gear; and wherein each said first and second planetary gear wheels comprises an auxiliary gearwheel coaxially rotatably mounted thereon, said auxiliary gearwheel mounted on said first planetary gear being interlocked in a gear tooth engagement with said sun gear and said first internal gear wheel and said auxiliary gear wheel mounted on said second planetary gear wheel being interlocked in a gear tooth engagement with said sun gear and said second internal gear wheel, wherein said auxiliary wheels eliminate circumferential backlash relative to said first internal gearwheel and said second internal gearwheel.

The auxiliary gearwheels minimize circumferential backlash or, in the case of a sprung design, completely eliminate the backlash. In addition, sprung auxiliary gearwheels prevent the development of further circumferential backlash should pitch errors or radial deviations occur. The auxiliary wheels allow high fold accuracy to be attained in both the primary fold and the second cross fold.

The arrangement of the compression spring in the ring groove permits the auxiliary gearwheel to be prestressed in the clockwise or counterclockwise direction, at option, as a result of which the driving or driven gearwheel flank can be assigned to the spur gear or to the auxiliary gearwheel.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
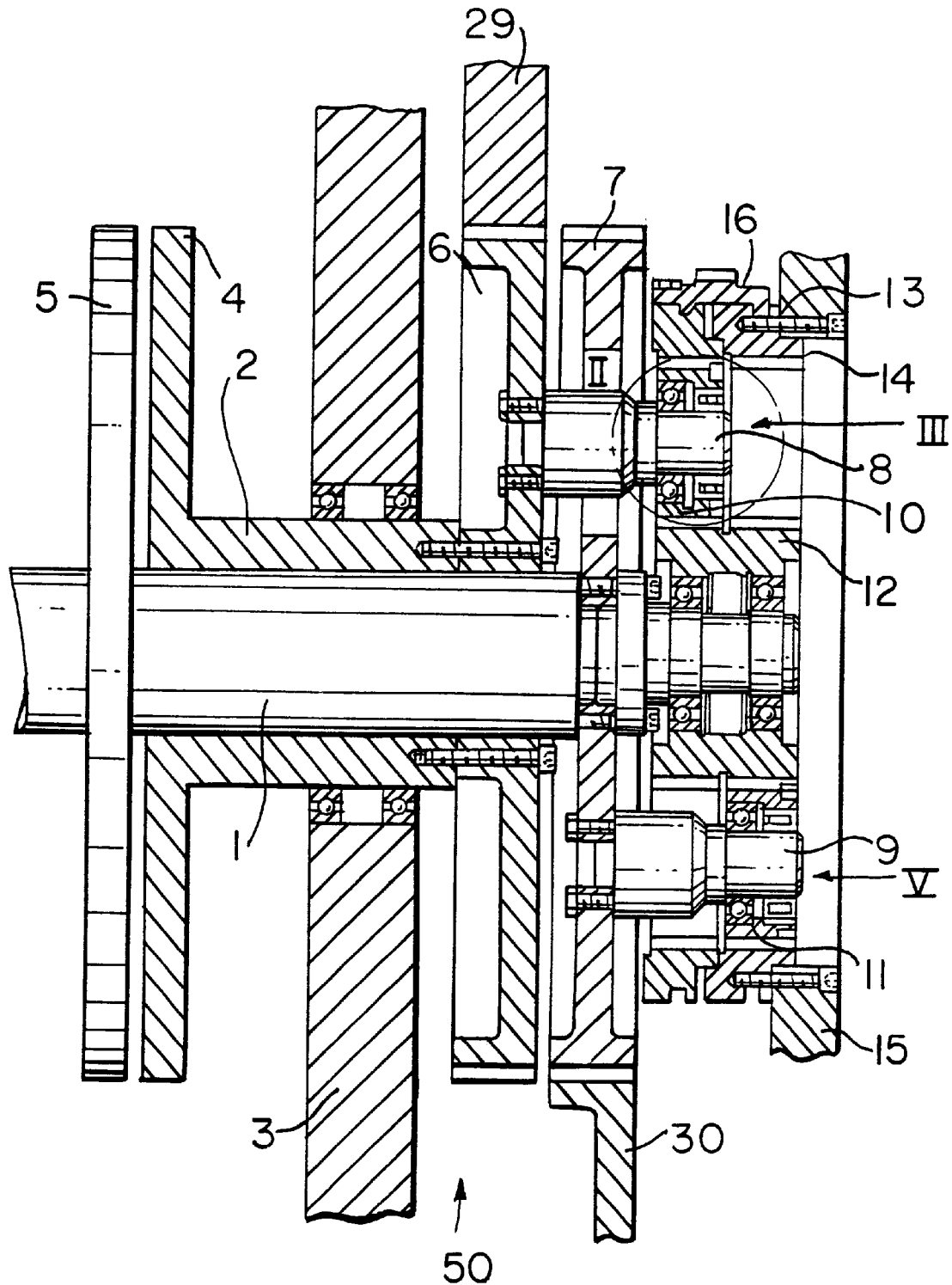
FIG. 1 shows the drive-side journal area of a folding cylinder with two planetary gearsets for fold adjustment.

FIG. 1 shows the drive-side journal area of a point folding blade cylinder 50 with two planetary gearsets for a primary fold adjustment. A hollow shaft 2 is connected to a first cylinder segment 4 that carries points, while a journal 1 is connected to a second cylinder segment 5 that carries the folding blades. In FIG. 1, only the first and second cylinder segments 4, 5 are indicated, the points and folding blades are not shown. Also attached to the hollow shaft 2 is a drive planet-arm gear 6. An output planet-arm gear 7 is attached to the shaft 1.

The drive planet-arm gear 6 carries a bolt 8, on which is rotatably mounted a first planetary gearwheel 10. The output planet-arm gear 7 similarly carries a bolt 9, on which is rotatably mounted a second planetary gearwheel 11. The first and second planetary gearwheels 10, 11 are in interlocking gear tooth engagement with a common sun gear 12, which is rotatably mounted on the journal 1. The first planetary gearwheel 10 is also in an interlocking engagement with the toothing of a first internal gearwheel 13, while the second planetary gearwheel 11 is in interlocking engagement with the toothing of a second internal gearwheel 14. The second internal gearwheel 14 is screwed to a bearing plate 15 connected to a side wall 3 (the connection of bearing plate 15 to side wall 3 is not shown). The first internal gearwheel 13 is rotatably mounted and carries a toothed rim 16, into which engages a servo drive (not shown) with a pinion. Instead of one first planetary gearwheel 10 and one second planetary gearwheel, it is also possible to provide several first planetary gearwheels 10 and several second planetary gearwheels 11 arranged at an equal circumferential distance from each other, for example, on the drive planet-arm gear and output planet-arm gear 6, 7.

Figure 2:
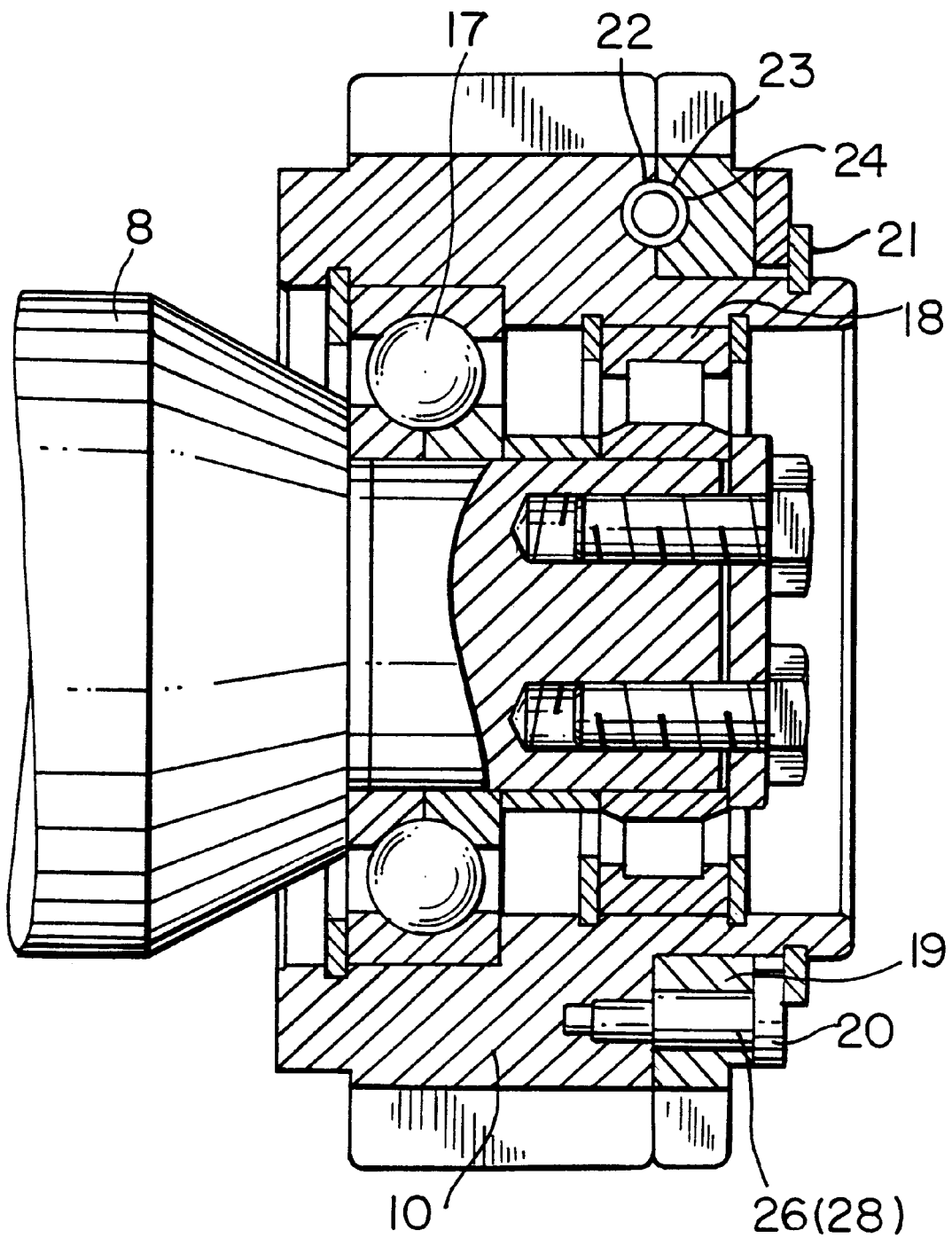
FIG. 2 is an enlarged view of the circled area II of FIG. 1.
Figure 3:
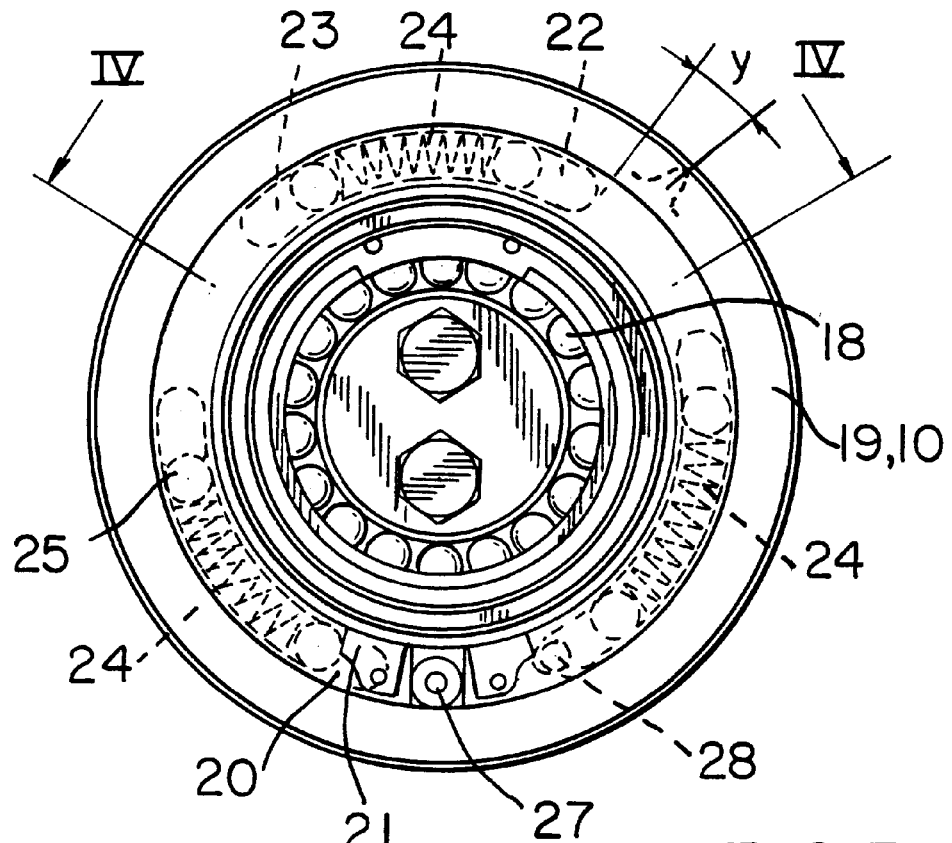
FIG. 3 shows the front of a first planetary gear as viewed in the direction of arrow III of FIG. 1.
Figure 4:
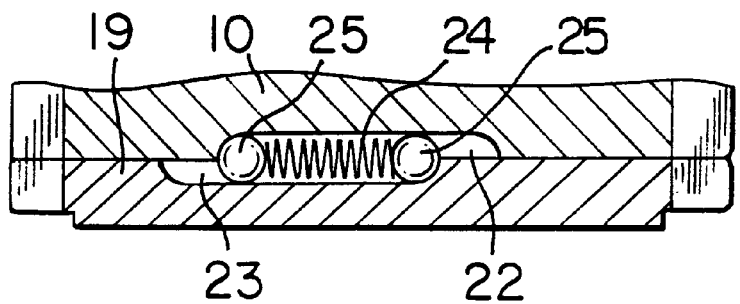
FIG. 4 is a sectional view of the first planetary gear along line IV—IV of FIG. 3.

The design of the first planetary gearwheel 10 is shown in FIGS. 2–4. The second planetary gearwheel 11 is similarly constructed. The planetary gearwheel 10 is mounted on the bolt 8 by two roller bearings 17, 18. Instead of two roller bearings 17, 18, other bearings such, for example, as slide bearings may also be used for this purpose. An auxiliary gearwheel 19 is rotatably mounted on a shoulder of the gearwheel body of the planetary gearwheel 10, and is secured against axial movement by a disk 20 and a securing ring 21. At least one circumferential ring groove 22, 23 is worked into the respective confronting faces of the planetary gearwheel 10 and the auxiliary gearwheel 19. These respective ring grooves 22, 23 are approximately the same depth. A compression spring 24, supported at the circumferential ends of the ring grooves 22, 23, is inserted into the ring grooves 22, 23. In the example, three equally spaced ring grooves 22, 23 are provided. Advantageously, the compression springs 24 rest on intermediate balls 25 at the ends of the ring grooves 22, 23 (see FIG. 4). The lengths of the ring grooves 22, 23 are preferably sized such that the compression springs 24, with or without the balls 25, are inserted without prestress. However, the springs 24 may be inserted with a prestress. Further, the ring grooves 22, 23 are advantageously embodied in relation to the toothings such that when the compression springs 24 are inserted and the auxiliary gearwheel 19 is not rotated from its equilibrium position relative to the first planetary gearwheel 10, the toothings of the first planetary gearwheel 10 and the auxiliary gearwheel 19 are aligned. This situation exists when there is an equal angular distance y (see FIG. 3) between the ring grooves 22, 23 and a reference point such, for example, as a toothing center of the toothings that carry the first and second planetary gearwheels 10, 11 and the auxiliary gearwheel 19.

When the first planetary gearwheel 10 is mounted into interlocking engagement with the toothings of the sun gear 12 and the toothings of the internal gearwheel 13, the auxiliary gearwheel 19 is mounted in a prestressed state. To this end, the auxiliary gearwheel 19 is turned counterclockwise (see FIGS. 3 and 4) by one or more tooth spaces, depending on the size of the compression springs 24. As FIG. 4 shows, the compression springs 24 are thereby supported via the balls 25 at the ends of the ring grooves 22, 23. In this position, to make mounting easier, a screw 27 is inserted through a boring 28 in the auxiliary gearwheel 19 and screwed into the body of the planetary gearwheel 10 (FIGS. 2, 3). The disk 20 is slit at this location. Thus arrested, the first planetary gearwheel 10 is installed along with the prestressed auxiliary gearwheel 19. After the first planetary gearwheel 10 and auxiliary gearwheel 19 are fully inserted, the screw 27 is removed and the first planetary gearwheel 10 and the auxiliary gearwheel 19 are turned toward each other by the force of the compression spring 24 until their respective driving flanks rest on counter-flanks of the sun gear 12 and the first internal gearwheel 13 and establish a play-free connection therewith. In the present case, the first planetary gearwheel 10 rests with its driving flank on the counter-flank of the sun gear 12.

Figure 5:
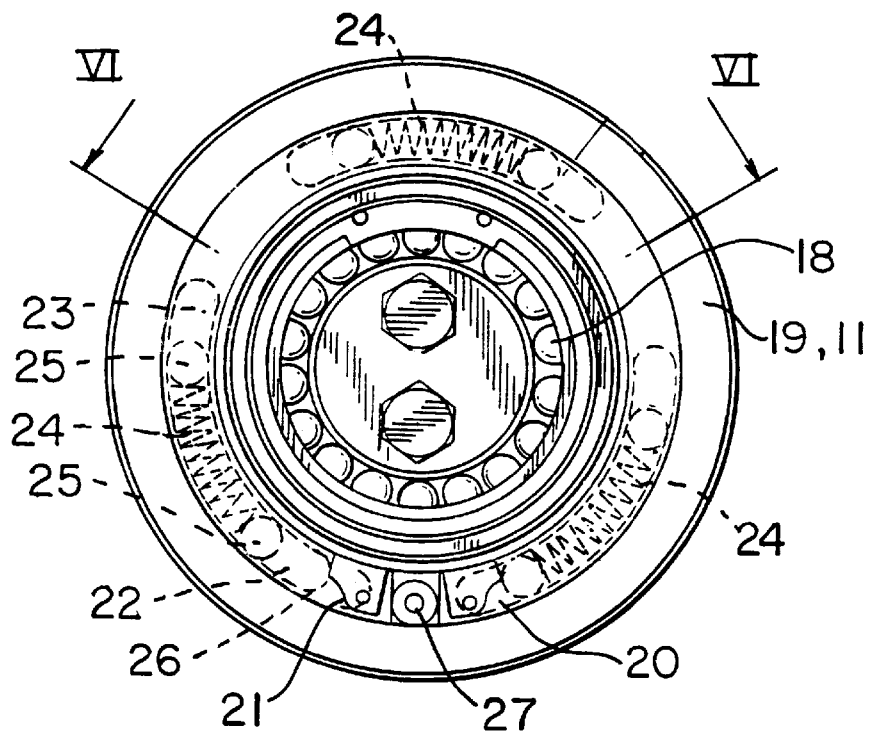
FIG. 5 shows the front of a second planetary gear as viewed in the direction of arrow V of FIG. 1.
Figure 6:
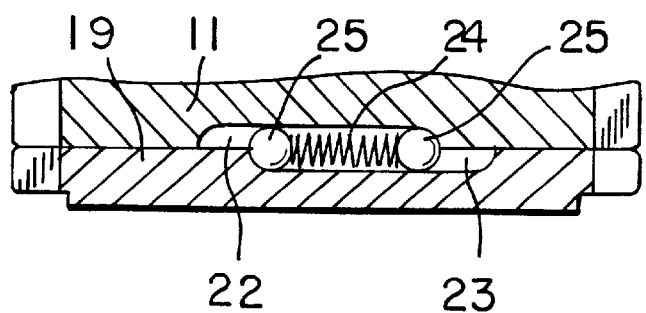
FIG. 6 is a sectional view of the second planetary gear along line VI—VI of FIG. 5.

As stated above, the second planetary gearwheel 11 is completed in the same manner as the first planetary gearwheel 10. For reasons of simplicity, the same reference numbers are used for the same components, and the second planetary gearwheel 11 is shown only in a top view (FIG. 5) and an associated partial section (FIG. 6). In contrast to the case of the first planetary gearwheel 10, the auxiliary gearwheel 19 associated with the second planetary gearwheel 11 is prestressed in the clockwise direction. In the prestressed position, a further boring 26 covers the threaded boring of the second planetary gearwheel 11, and the auxiliary gearwheel 19 is arrested with a screw 27. In this state, the toothings of the second planetary gearwheel 11 and the associated auxiliary gearwheel 19 are aligned, so that these two gearwheels are in interlocking engagement with the toothings of the sun gear 12 and the second internal gearwheel 14. After removal of the screw 27, the secondary planetary gearwheel 11 and the second auxiliary gearwheel 19 are turned toward each other by the force of the compression spring 24 until their respective drive flanks rest on the associated flanks of the sun gear 12 and the second internal gearwheel 14 and establish a drive connection free of torsional play. In the present case, the second planetary gearwheel 11 rests with its flank on the driving flank of the sun gear 12. The auxiliary gearwheel 19 may be prestressed in the clockwise or the counterclockwise direction, at option, and the same drive conditions can thus be created at both the first and second planetary gearwheels 10, 11.

The first and second cylinder segments 4 and 5 embody a point folding blade cylinder, which interacts with a folding blade cylinder (not shown). The driving planet-arm gear 6, the first planetary gearwheel 10, the sun gear 12, and the first internal gearwheel 13 form a first planetary gearset. Similarly, the output planet-arm gear 7, the second planetary gearwheel 11, the sun gear 12 and the internal gearwheel 14 form a second planetary gearset, which planetary gearsets serve for the primary fold adjustment. The drive is conducted by a spur gear 29 (FIG. 1) to the drive planet-arm gear 6, then further via the first planetary gearwheel 10, the sun gear 12 and the second planetary gearwheel 11 to the output planet-arm gear 7. Upon initiation of an adjustment movement such as when the first internal gearwheel 13 is turned, the output planet-arm gear 7 is also turned. Thus the position of the cylinder segment 5 with the folding blades is shifted. At the same time, like these folding blades, the non-depicted folding blade cylinder with folding blades is rotated by a spur gear 30 in toothed engagement with the output planet-arm gear 7. That is, the portion of the spur gear not shown is in an interlocking gear tooth engagement with the non-depicted folding blade cylinder for driving the non-depicted folding blade cylinder when the output planet-arm gear 7 is rotated.

Similar planetary gears with first and second planetary gearwheels 10, 11 and auxiliary gearwheels 19 may be used on a gripper folding blade cylinder, with which, in connection with a jaw cylinder, a second cross fold is produced. The structure of the first and second planetary gearwheels 10, 11 with the auxiliary gearwheels 19 is the same as in the previous examples, for which reason no drawings or further explanatory details are given. It should simply be noted that in this case, the drive planet-arm gear 6 is connected to a cylinder segment that carries a gripper, while the output planet-arm gear 7 is connected to a cylinder segment that carries a folding blade. The use of planetary gearsets is described in the above-cited DE 44 26 987 A1, which should therefore be seen as belonging to the present application.

The invention is not limited by the embodiments described above which are presented as examples only but can be modified in various ways within the scope of protection defined by the appended patent claims.

I claim:

1. A folding device for jaw folds, comprising:

a folding cylinder having a drive journal and first and second cylinder elements carrying folding elements and rotatably mountable in a sidewall of said folding device;

first and second planetary gear sets, said first planetary gear set comprising a drive planet-arm gear fixedly connected to the first cylinder element and a first planetary gear wheel rotatably mounted on said drive planet-arm gear and said second planetary gear set comprising an output planet-arm gear fixedly connected to the second cylinder element and a second planetary gear wheel rotatably mounted on said output planet-arm gear;

a first internal gear wheel in interlocking gear tooth engagement with said first planetary gear wheel;

a second internal gear wheel in interlocking gear tooth engagement with said second planetary gear wheel and fixedly connectable with respect to the sidewall, said first internal gear wheel being rotatably connected to said second internal gear wheel;

a sun gear rotatably mounted on said drive journal, wherein each said first planetary gear wheel and said second planetary gear wheel is in an interlocking gear tooth engagement with said sun gear;

wherein each said first and second planetary gear wheels comprises an auxiliary gearwheel coaxially rotatably mounted thereon, said auxiliary gearwheel mounted on said first planetary gear being interlocked in a gear tooth engagement with said sun gear and said first internal gear wheel and said auxiliary gear wheel mounted on said second planetary gear wheel being interlocked in a gear tooth engagement with said sun gear and said second internal gear wheel, wherein each said auxiliary wheels rests resiliently on one of said first and second planetary gearwheels with respect to a circumferential direction for eliminating circumferential backlash relative to said first internal gearwheel and said second internal gearwheel and thereby increasing a fold accuracy of said folding device;

wherein each said first and second planetary gear wheel comprises a first surface axially confronting a second surface of said auxiliary gear wheel, and each said first and second surfaces comprises at least one ring groove worked to approximately the same depth, said ring grooves of said first and second surfaces lie against each other, and said folding device further comprises a compression spring inserted in said ring groove and supportable at the ends of the ring grooves; and wherein each said first and second planetary gear wheels and said auxiliary gear wheels comprises toothing having a reference point and said ring grooves of said first and second planetary gearwheels and of said auxiliary gearwheels are positioned a same angular distance ($\gamma$) to each said reference points.

2. A folding device for jaw folds, comprising:

a folding cylinder having a drive journal and first and second cylinder elements carrying folding elements and rotatably mountable in a sidewall of said folding device;

first and second planetary gear sets, said first planetary gear set comprising a drive planet-arm gear fixedly connected to the first cylinder element and a first planetary gear wheel rotatably mounted on said drive planet-arm gear and said second planetary gear set comprising an output planet-arm gear fixedly connected to the second cylinder element and a second planetary gear wheel rotatably mounted on said output planet-arm gear;

a first internal gear wheel in interlocking gear tooth engagement with said first planetary gear wheel;

a second internal gear wheel in interlocking gear tooth engagement with said second planetary gear wheel and fixedly connectable with respect to the sidewall, said first internal gear wheel being rotatably connected to said second internal gear wheel;

a sun gear rotatably mounted on said drive journal, wherein each said first planetary gear wheel and said second planetary gear wheel is in an interlocking gear tooth engagement with said sun gear;

wherein each said first and second planetary gear wheels comprises an auxiliary gearwheel coaxially rotatably mounted thereon, said auxiliary gearwheel mounted on said first planetary gear being interlocked in a gear tooth engagement with said sun gear and said first internal gear wheel and said auxiliary gear wheel mounted on said second planetary gear wheel being interlocked in a gear tooth engagement with said sun gear and said second internal gear wheel, wherein each said auxiliary wheels rests resiliently on one of said first and second planetary gearwheels with respect to a circumferential direction for eliminating circumferential backlash relative to said first internal gearwheel and said second internal gearwheel;

wherein each said first and second planetary gear wheel comprises first surface axially confronting a second surface of said auxiliary gear wheel, and each said first and second surfaces comprises at least one ring groove worked to approximately the same depth, said ring grooves of said first and second surfaces lying against each other, a compression spring inserted in said ring groove and supportable at the ends of the ring grooves, and a ball inserted between each end of said compression spring and said ring groove.

3. The folding device of claim 2, wherein each said first and second planetary gear wheels and said auxiliary gear wheels comprises toothing having a reference point and said ring grooves of said first and second planetary gearwheels and of said auxiliary gearwheels are positioned a same angular distance ($\gamma$) to each said reference points.

* * * * *